United States Patent [19]
Blankenship

[11] Patent Number: 6,091,612
[45] Date of Patent: Jul. 18, 2000

[54] UNIVERSAL POWER SUPPLY FOR ARC WELDER

[75] Inventor: George D. Blankenship, Chardon, Ohio

[73] Assignee: Lincoln Global, Inc., Cleveland, Ohio

[21] Appl. No.: 09/366,760

[22] Filed: Aug. 4, 1999

[51] Int. Cl.[7] .................................................. H02M 1/12
[52] U.S. Cl. ............................................. 363/45; 323/208
[58] Field of Search ........................ 219/137 PS; 363/450, 363/126; 323/282, 208

[56] References Cited

U.S. PATENT DOCUMENTS

| | | |
|---|---|---|
| 5,117,088 | 5/1992 | Stava . |
| 5,235,504 | 8/1993 | Sood . |
| 5,517,086 | 5/1996 | El-Hamamsy et al. . |
| 5,991,180 | 11/1999 | Vogel et al. ............................. 363/89 |
| 6,002,103 | 12/1999 | Thommes ............................. 219/130.21 |

OTHER PUBLICATIONS

"Fluorescent Ballast Design Using Passive P.F.C. and Crest Factor Control," by Peter N. Wood, pp. 1–10, AN–998 No Date, Publisher/Source, etc.

*Primary Examiner*—Shawn Riley
*Attorney, Agent, or Firm*—Vickers, Daniels & Young

[57] ABSTRACT

A single phase power supply for electric arc welders comprising: a full wave rectifier forming the input of said power supply; a valley fill power factor correcting circuit for controlling input current flow to the rectifier and creating an high crest factor intermediate voltage; a converter forming the output of the power supply for converting the intermediate voltage into a generally ripple free DC voltage; and, switching means in the converter for controlling the output voltage of the converter to a level in the general range of 20–100 volts for welding.

31 Claims, 6 Drawing Sheets

UNIVERSAL POWER SUPPLY FOR ARC WELDER

The present invention relates to the art of arc welders and more particularly a power supply especially adapted for an electric arc welder.

INCORPORATION BY REFERENCE

The present invention relates to the valley fill power factor correcting circuit for controlling current flow to a full wave rectifier used to rectify single phase power supply. The valley fill power factor circuit is a passive circuit shown in Application Note AN-998 from International Rectifier and entitled "Fluorescent Design Using Passive P.F.C. and Crest Factor Control" by Peter N. Wood. As background information to disclose the use of the passive valley fill type power factor circuit and its high crest factor output voltage this application note is incorporated by reference. Further, a modified valley fill power factor control circuit for use in a ballast is shown in El-Hamamsy U.S. Pat. No. 5,517,086, which is also incorporated by reference. These two prior art publications adequately describe the limitations of the passive valley fill type power factor circuit and its use in low quality DC applications. Since the present invention relates to a passive power factor correcting circuit for correcting the power factor at the input side of a full wave rectifier, complicated active power factor circuits of the buck-boost type merely illustrate background. An active buck-boost power factor correcting circuit for electric motors is illustrated in Sood U.S. Pat. No. 5,235,504, which patent is also incorporated by reference. The passive valley fill circuit has heretofore been used only for uncontrolled DC applications, such as lighting ballast because of its high crest factor and other limitations.

BACKGROUND OF INVENTION

It is common practice to provide a DC to DC converter, such as a pulse width modulated chopper to convert a single phase AC power supply into a DC current or voltage for electric arc welding or for electric plasma cutting. Such power supplies are specially designed for 60 Hz 110 volt or 220 volt inputs. As the input voltage changes and the frequency changes, such power supplies experience a power factor of less than 90% and a THD exceeding industrial equipment regulations such as IEC-1003. Consequently, it is desirable for inverters, such as down choppers when used in welding machines, to be constructed for increasing the power factor and/or minimizing the THD. In addition, it is desirable that the power supply accept input voltages of 200–600 VAC at frequencies of 50 Hz, 60 Hz or other variations. It has been suggested that a power supply accomplishing these objectives could be provided by a dual stage power supply including a first stage inverter with an active, switching type power factor correcting circuit to provide controlled DC input to a second stage inverter. This two inverter concept for correcting the power factor in an electric arc welder of the down chopper type is disclosed in U.S. Pat. No. 5,991,169 filed by assignee of this application on Mar. 16, 1998 and entitled Arc Welding Power Supply. This patent is incorporated by reference herein as background information even though it is not prior art. The use of a two inverter stage power supply for providing power factor corrections at the same time as controlling the DC voltage at the output of the welder is complicated and expensive. It is desirable to have an inexpensive power supply driven by an AC input voltage which can range between 200–600 volts AC with a power factor greater than 0.95 with a controlled DC output voltage.

THE INVENTION

The present invention relates to a single phase power supply for an electric arc welder which utilizes a passive valley fill power factor correcting circuit for driving an output inverter, preferably a down chopper. In accordance with the invention the single phase power supply for an electric arc welder comprises a full wave rectifier forming the input of the power supply and a passive valley fill power factor correcting circuit for controlling input current flow to the rectifier from a single phase source and creating a high crest factor voltage, i.e. above about 1.5. A converter forms the output of the power supply and includes a switching means for controlling the DC output voltage of the converter in the general range of 20–100 volts. The converter converts the high crest factor voltage from the PFC circuit to a steady state DC welding current. In accordance with the preferred embodiment of the invention, the passive power factor correcting circuit is a 50% valley fill circuit.

The present invention is less expensive than a power supply using an active power factor correction circuit and is less complex than such a circuit used in an electric arc welders. The use of the passive valley fill circuit is extremely simple and achieves a power factor substantially greater than 95%. Also, the circuit has a somewhat minimum THD. Since a valley fill power factor correcting circuit has high crest factor, it has been heretofore believed to be unacceptable for the controlled type of power supply used in electric arc welding. The present invention combines a valley fill circuit with an output converter preferably a down chopper having a range of regulation to remove the high ripple factor associated with a valley fill circuit.

The present invention relates to a power supply which can be connected to a single phase input voltage in the range of 200–600 volts AC to provide a regulated output voltage for welding which has a minimum THD and a high power factor over about 0.95. This objective was heretofore solved by providing a two stage inverter, with the first stage being an inverter with a standard active power factor correcting chip and the second stage being an output down chopper. This power supply is the subject of U.S. Pat. No. 5,991,169. The two stage power supply is expensive and requires the complexity of an active power factor correction circuit. The present invention provides a simplified inexpensive power supply for accomplishing the same objectives by using a valley fill passive power factor correcting circuit between the full wave rectifier and the output converter, which is preferably a down chopper. The output of the down chopper is controlled by a pulse width modulator operated at a high frequency such as 10–20 kHz to provide smoothing of the ripple output of the valley fill power factor correcting circuit. Thus, a single stage inverter is employed for the welder power supply with an inexpensive circuit to correct the power factor of the power supply by reducing the THD.

The primary object of the present invention is the provision of a universal power supply for an arc welder driven by an AC source having a voltage between 200–600 VAC with a regulated DC output voltage, which power supply has a low THD, a high power factor and utilizes a single converter stage with a passive power factor correcting circuit.

Yet another object of the present invention is the provision of a universal power supply, as defined above, which universal power supply employs a valley fill power factor correcting circuit and preferably a 50% valley fill circuit.

Still a further object of the present invention is the provision of a universal power supply as defined above which is inexpensive, efficient in operation and may be employed in a wide variety of welding and/or plasma cutting installations.

These and other objects and advantages will become apparent from the following description taken together with the accompanying drawings.

PREFERRED EMBODIMENT

Figure 1:
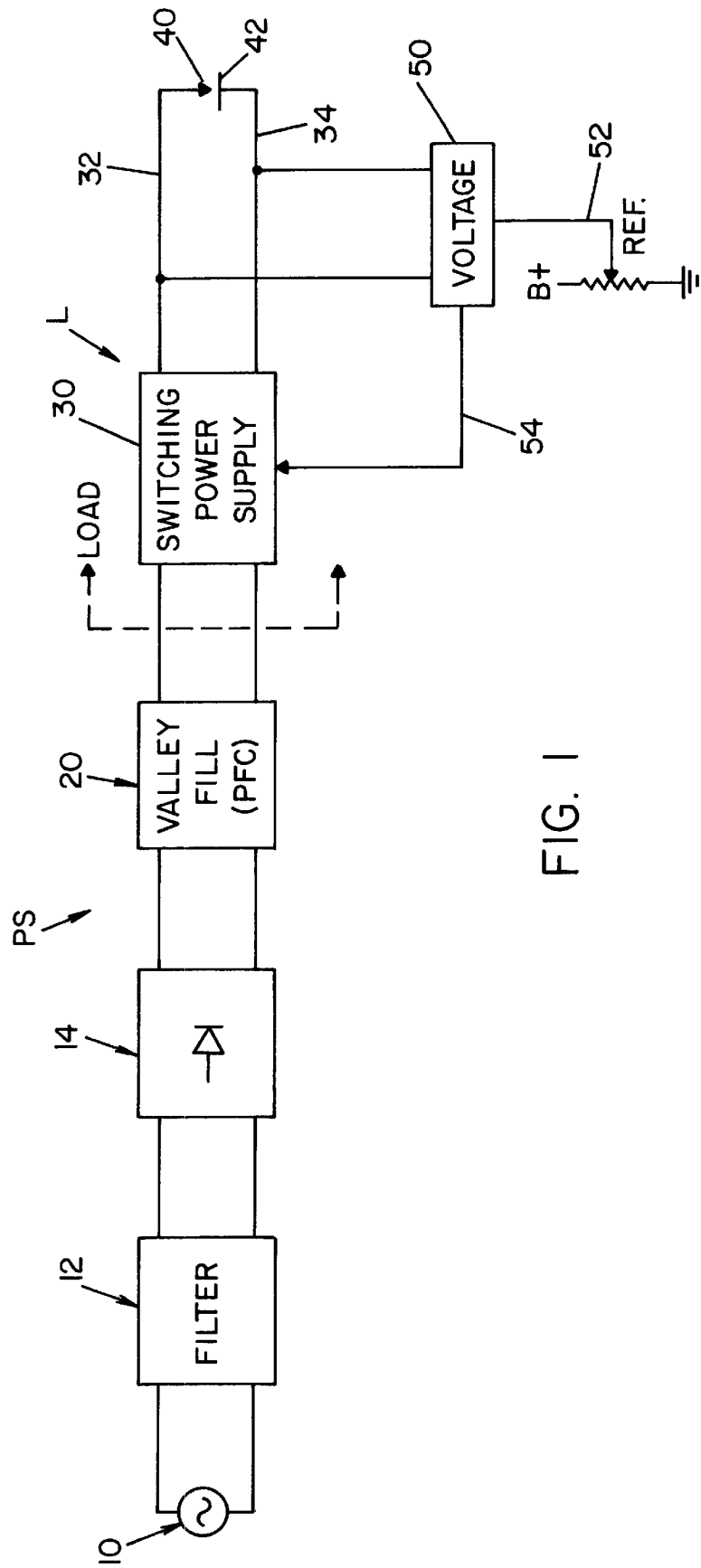
FIG. 1 is a schematic block diagram illustrating the preferred embodiment of the present invention.

Referring now to the drawings, wherein the showings are for the purpose of illustrating the preferred embodiment of the invention only and not for the purpose of limiting same, FIG. 1 shows a universal power supply PS including a single phase input source 10, filter 12 and a full wave rectifier 14 controlled by a 50% valley fill power factor correcting circuit 20 located between the rectifier and load L. In accordance with the invention, the load is a high speed switching converter 30 having terminals 32, 34 for directing current across electrode 40 and workpiece 42 in accordance with the controlled DC voltage across terminals 32, 34. The arc voltage is sensed by circuit 50 and compared with a reference voltage in accordance with a signal on line 52 to provide an input voltage command signal in line 54 which controls the duty cycle of a pulse width modulated switching circuit as is well known. Switching converter 30 is preferably a down chopper, as disclosed in FIG. 4A, and may be an inverter, such as a standard series resonant inverter having an adjusted operating range to remove the ripple from the high crest factor voltage output of valley fill power factor correcting circuit 20.

Figure 2:
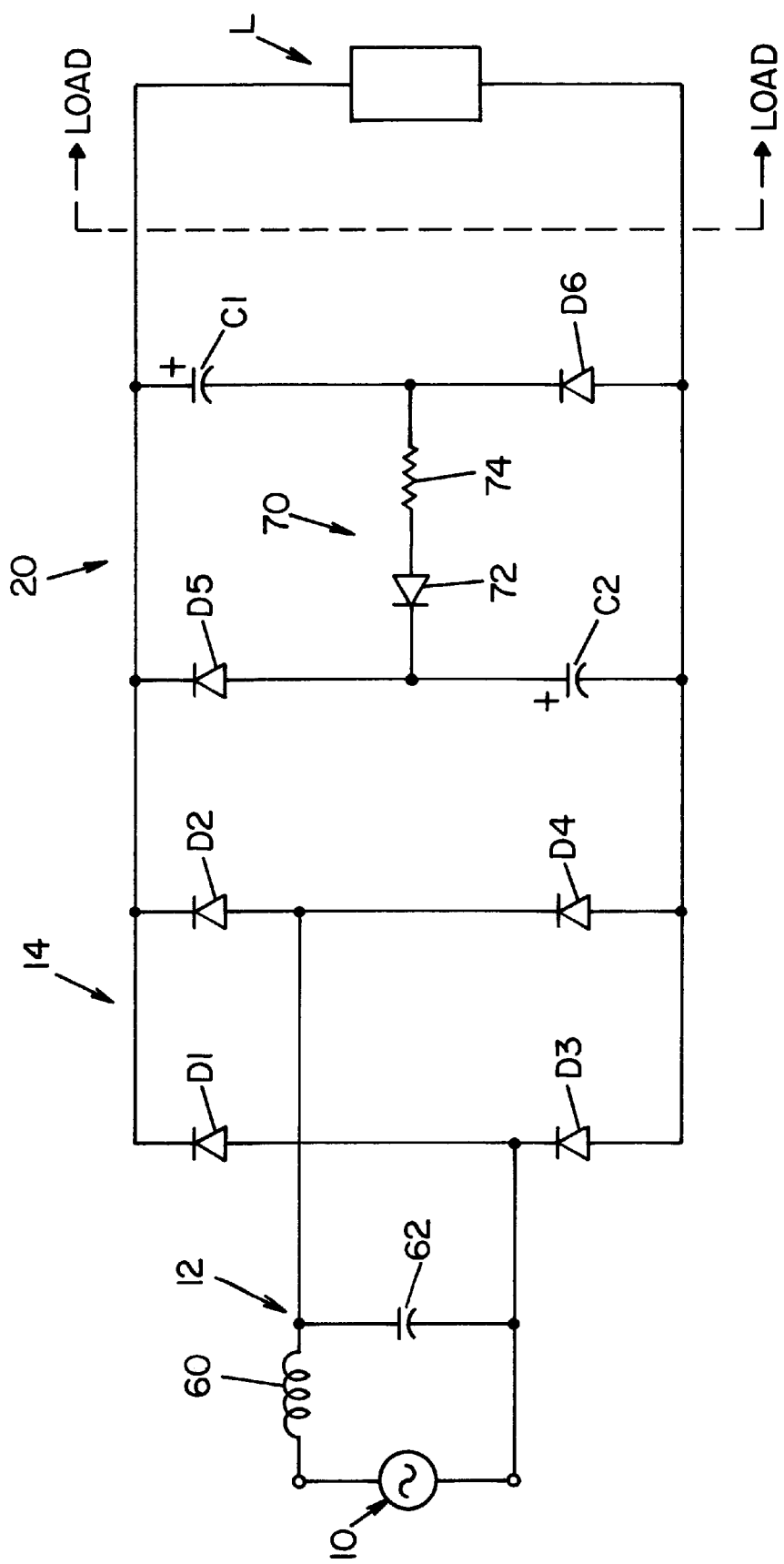
FIG. 2 is a wiring diagram illustrating the valley fill power factor correcting circuit used in the present invention.
Figure 3A:
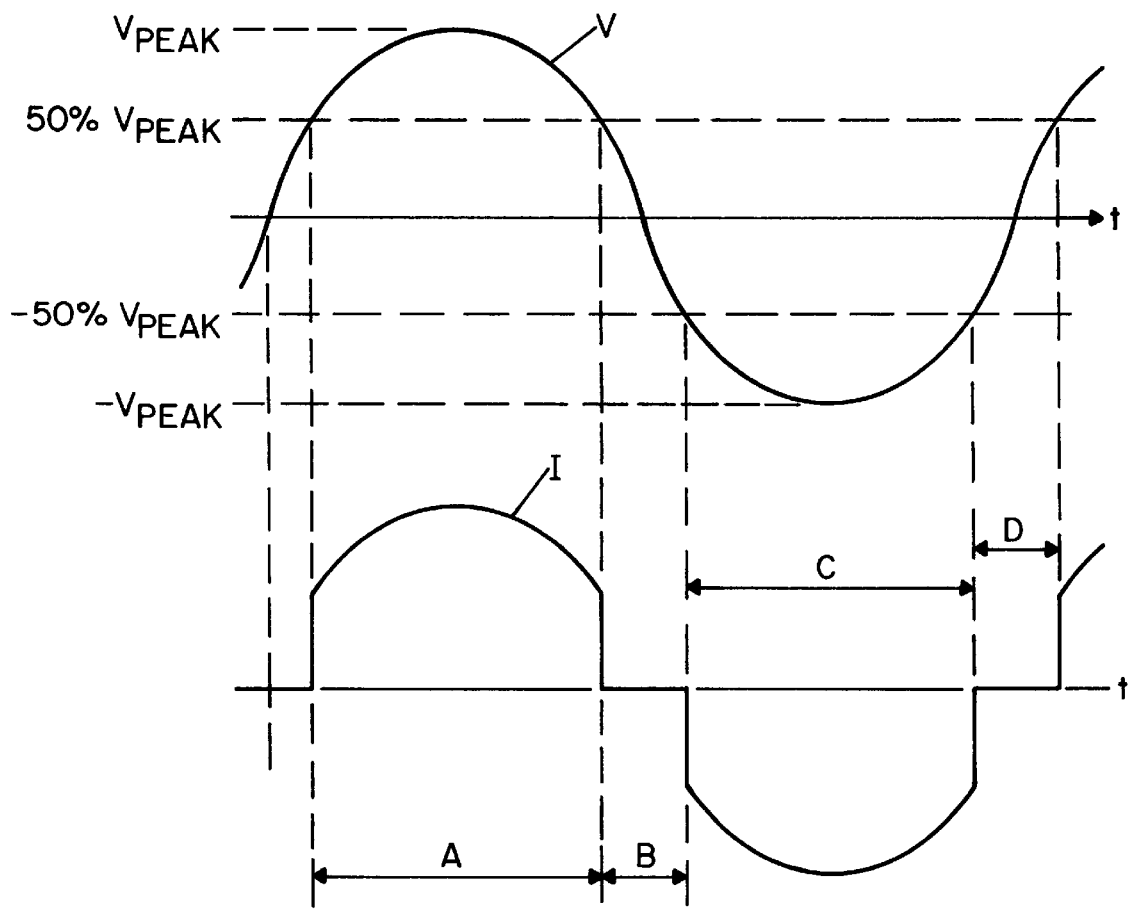
FIG. 3A is a graph showing the input voltage and current developed by the circuit shown in FIG. 2.
Figure 3B:
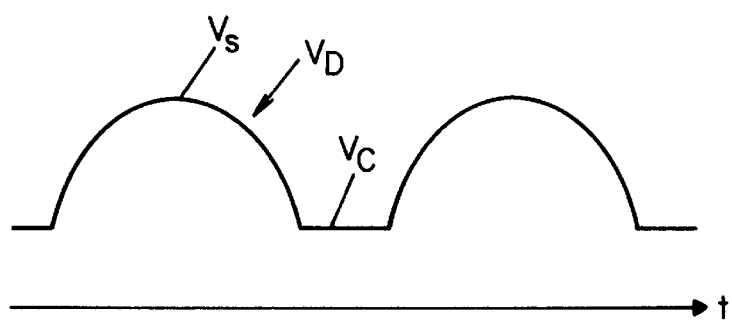
FIG. 3B is a graph showing the high crest factor output DC voltage of the valley fill circuit.

Referring now to FIGS. 2, 3A and 3B, single phase source 10 has a voltage in the range of 200–600 VAC which is filtered by inductor 60 and capacitor 62 before being rectified. Rectifier 14 includes diodes D1–D4. As shown in FIG. 2, power factor correcting circuit 20 includes storage capacitor C1, C2 with series diodes D5 and D6. Capacitor charging circuit 70 includes diode 72 and resistor 74. Power factor correcting circuit 20 causes current to flow from source 10 when the output voltage $V_D$ of load L exceeds the voltage $V_C$, as shown in FIG. 3B. This gives a ripple output voltage that must be smoothed by load L when the power supply is used for welding and/or plasma cutting. The input wave form for voltage V and input current I is shown in FIG. 3A. When source 10 is providing energy to load L during period $V_S$ in FIG. 3B, current I flows in the rectifier 14. When capacitor C1 is providing the energy, no current flows in the source. The operation of the valley fill circuit is best shown in FIG. 3A wherein the period A is a positive half cycle, period C is a negative half cycle and periods B and D are times t when there is no current flow. During period A capacitors C1 and C2 charge through diodes D2 and D3 of rectifier 14 and charging circuit 70, including diode 72 and resistor 74. Load L is supplied directly from the source through diodes D2 and D3. During period B, load L is supplied from capacitor C1 and C2 through diodes D5 and D6. During period C, capacitor C1 and C2 charge through diodes D1 and D4 of rectifier 14 and the charging circuit 70. Load L is supplied directly from the source through diodes D1 and D4. Period D operates in the same as period B. Periods B and D are the times when harmonics are created; however, these times are at low energy because the voltage is near zero. Consequently, in this passive circuit the harmonics are created during low energy portions of the cycle. There is a low THD and, thus, a high power factor. Inductor 60 and capacitor 62 are small filter elements to prevent transient noise generated at load L from reaching the input source 10 during periods A and C. This type of circuit has a high crest factor giving a high ripple, as illustrated in FIG. 3B; however, the output load, in accordance with the present invention, is for welding and has a sufficient range to smooth out the ripple of the intermediate voltage provided by circuit 20.

By using the present invention, the input voltage is single phase and can vary between 200–600 VAC with a power factor greater than 0.95 without the detrimental effect of the high crest factor. Consequently, the power supply is usable for a wide variety of input voltage sources having a variety of frequencies. The frequency does not affect the overall operation of the present invention where the valley fill circuit, in combination with a high speed switching inverter is used. The inverter is preferably a down chopper, but could be a series resonant inverter to provide a wide range of DC voltage for welding and/or plasma cutting without excessive harmonic distortion. A distortion occurs only at low energy to produce a high power factor.

Figure 4A:
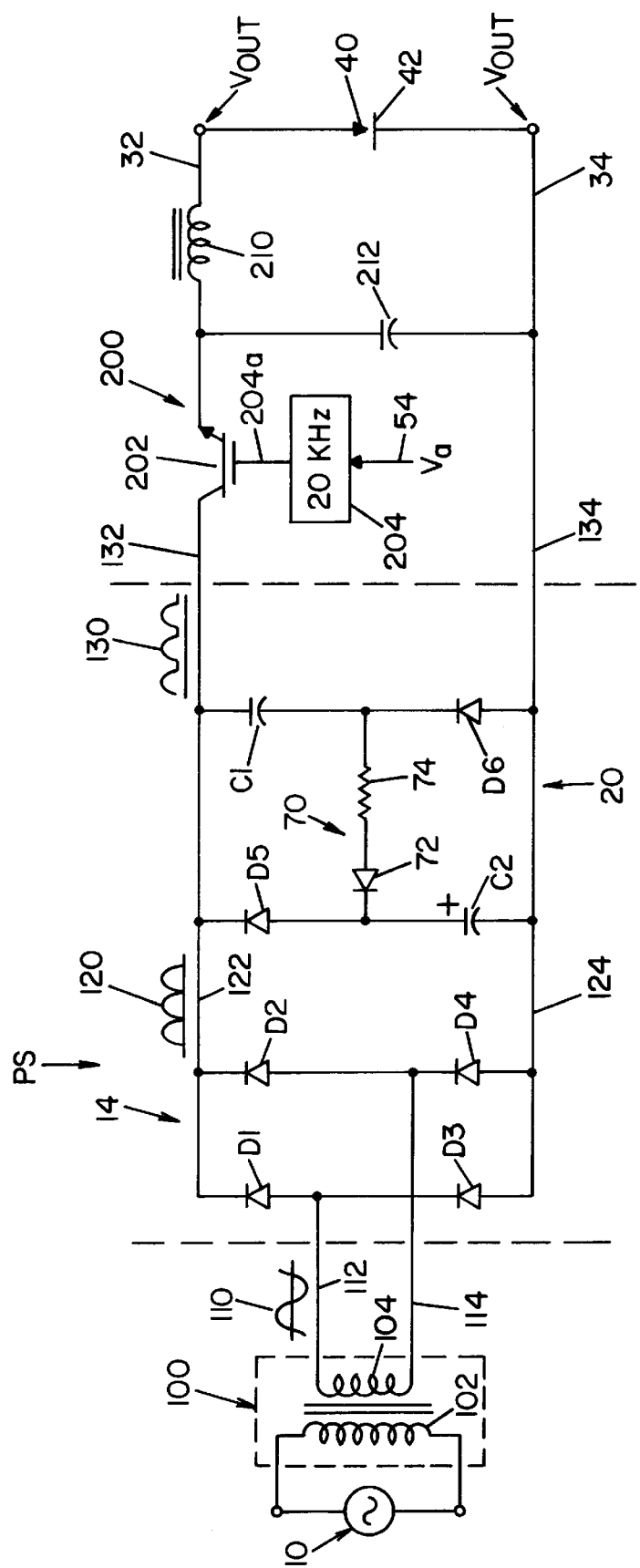
FIG. 4A is a wiring diagram showing the preferred embodiment of the present invention.
Figure 4B:
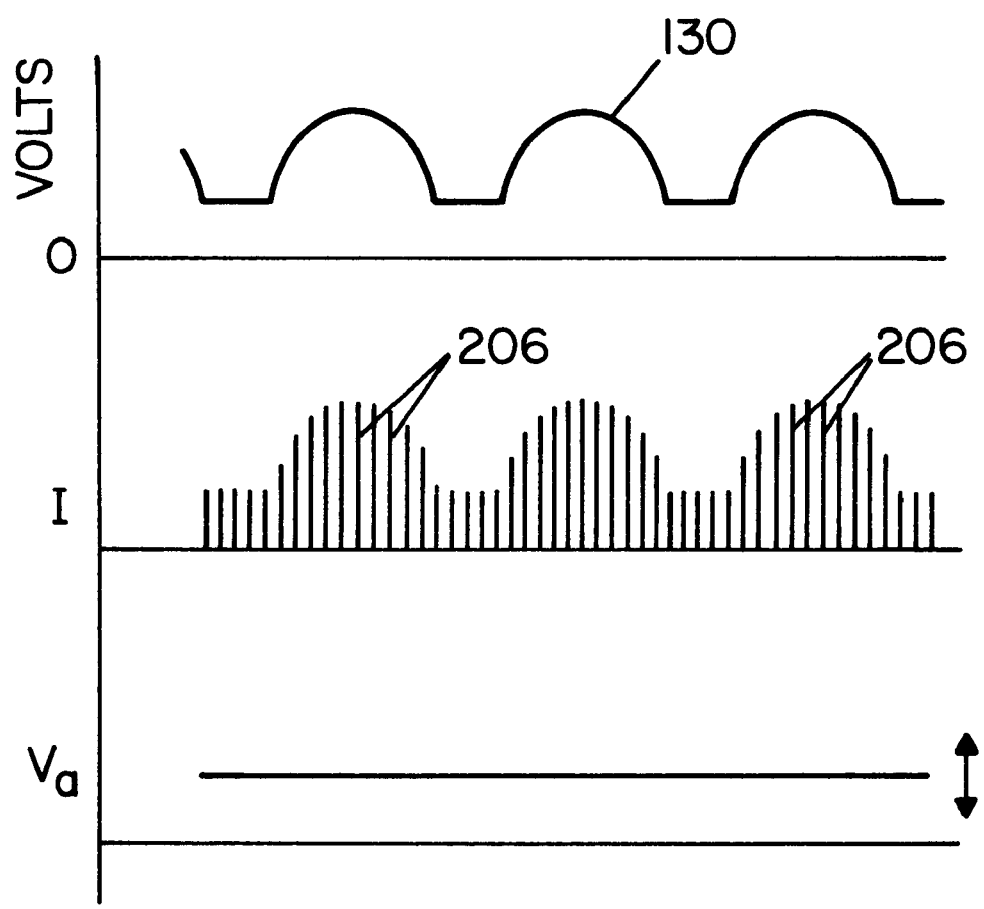
FIG. 4B is a set of graphs showing the pulse width modulated current pulses used to control the DC output voltage which is represented in the lower graph; and, FIG. 5 is a wiring diagram illustrating a modification of the preferred embodiment.

The preferred embodiment of the present invention schematically illustrated in FIG. 1 is the power supply PS shown in FIG. 4A wherein source 10 has a voltage in the range of 200 600 VAC. Transformer 100 having primary winding 102 and secondary winding 104 provides a controlled level of AC voltage with wave form 110 in lines 112, 114. This voltage is directed to rectifier 14. The output of the rectifier is shown as wave form 120 in lines 122, 124. The wave form 130 of power factor correcting circuit 20 is in lines 132, 134. In accordance with the preferred embodiment, converter 30 of load L is down chopper 200 accepting the high ripple or high crest factor voltage across lines 132, 134. High speed switch 202, such as a IGBT, is controlled by a pulse width modulator 204 having an output 204a to convert the high ripple wave form from circuit 20 into a desired welding output voltage at terminals 32, 34 in accordance with an appropriate command signal such as command signal 54. By using a down chopper with a pulse width modulator operated at a high frequency such as 10–20 kHz, the high crest factor wave form associated with passive power factor correction circuit is smoothed out and used for welding and/or plasma cutting. This is illustrated in FIG. 4B where wave form 130 is gated as a series of high frequency current pulses 206 to inductor 210 so the arc voltage shown in the bottom graph of FIG. 4B appears across capacitor 212. The duty cycle of pulses 206 is controlled by the pulse width modulator with a range to remove the high ripple in wave form 130 and—$V_a$ has a maximum voltage of 113 volts at zero amperes. Consequently, source 10 has a high power factor, low harmonics and the voltage $V_a$ across terminals 32, 34 is accurately controlled as indicated by the arrows in FIG. 4B. Thus, power supply PS is universal and can be used without the complexity of an active power factor correction or the need for a two stage inverter circuit.

Figure 5:
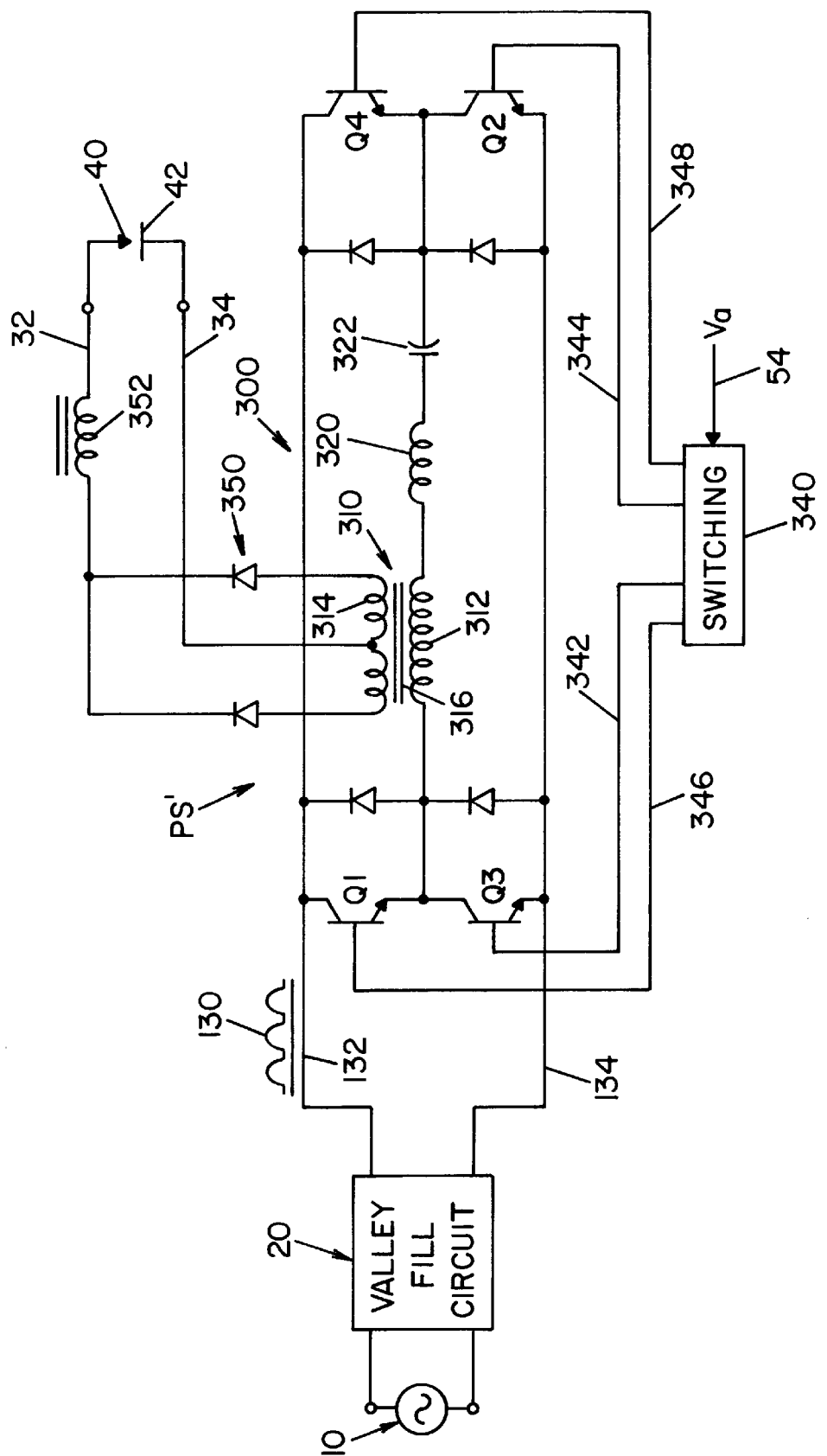

Although a down chopper with a high speed pulse width modulator used to convert the high crest factor voltage 130 from circuit 20 to a usable DC voltage $V_a$ for welding and/or plasma cutting is the preferred implementation of the invention, the invention can also employ another converter, such as a series resonant inverter, as power supply PS' shown in FIG. 5. Source 10, having various voltages, is controlled by valley fill circuit 20 to give output voltage wave form 130 across lines 132, 134 as explained in FIG. 4A. Load L is a series resonant inverter 300 having sufficient range to provide welding voltage $V_a$ across terminals 32, 34, as also explained in FIGS. 1 and 4A. Inverter 300 includes parallel switches Q1, Q2, Q3 and Q4 that are sequentially switched to create an AC current in transformer 310 having a primary winding 312, secondary winding 314 and core 316. Resonant inductor 320 and resonant capacitor 322 causes an AC output determined by the conduction times of the various switches Q1–Q4 in accordance with standard operation of this inverter topography. The conduction of switches Q1–Q4 control the voltage at terminals 32,34. Such conduction times for the switches is controlled by the signal on gate leads 342–348 in accordance with sensed voltage $V_a$. The duty cycles of the switches, which are IGBTs are controlled by a pulse width modulator or other switching network 340. Rectifier 350 directs the desired DC output current through inductor 352 that smooths out the current and removes any residual ripples in output voltage $V_a$.

In accordance with the present invention the output voltage $V_a$ of converter 300 is in the range of 20–100 volts. The peak voltage of circuit 20 is variable according to the input voltage of source 10, which varies between 200–600 volts. The output inverters control $V_a$ to less than 113 volts. The preferred embodiment of the invention is illustrated in FIG. 1 can include the transformer shown in FIG. 4A and does include this transformer in the preferred implementation of the invention. As a matter of background, Stava U.S. Pat. No. 5,117,088 is incorporated by reference herein to show a series resonant type of inverter.

What is claimed is:

1. A single phase power supply for electric arc welders comprising: a full wave rectifier forming the input of said power supply; a valley fill power factor correcting circuit for controlling the input current flow to said rectifier and creating an high crest factor intermediate DC voltage; a switching converter forming the output of said power supply for converting said intermediate voltage into a generally ripple free DC output voltage; and, switching means in said converter for controlling said DC output voltage of said converter to a level in the general range of 20–110 volts for welding.

2. A single phase power supply as defined in claim 1 wherein said valley fill circuit is a 50% valley fill circuit.

3. A single phase power supply as defined in claim 2 wherein said converter is a down chopper.

4. A single phase power supply as defined in claim 2 wherein said valley fill circuit has a variable peak voltage.

5. A single phase power supply as defined in claim 4 wherein said peak voltage is in the range of 200–600 volts.

6. A single phase power supply as defined in claim 1 wherein said converter is a down chopper.

7. A single phase power supply as defined in claim 6 wherein said valley fill circuit has a variable peak voltage.

8. A single phase power supply as defined in claim 1 wherein said valley fill circuit has a variable peak voltage.

9. A single phase power supply as defined in claim 8 wherein said peak voltage is in the range of 200–600 volts.

10. A single phase power supply as defined in claim 2 wherein said converter is a series resonant inverter.

11. A single phase power supply as defined in claim 1 wherein said converter is a series resonant inverter.

12. A single phase power supply as defined in claim 11 wherein said valley fill circuit has a variable peak voltage.

13. A single phase power supply as defined in claim 12 wherein said peak voltage is in the range of 200–600 volts.

14. A single phase power supply as defined in claim 1 including a transformer with a primary winding connected to a line voltage source and a secondary winding driving said rectifier.

15. A single phase power supply as defined in claim 14 wherein said valley fill circuit is a 50% valley fill circuit.

16. A single phase power supply as defined in claim 14 wherein said converter is a down chopper.

17. A single phase power supply as defined in claim 14 wherein said converter is a series resonant inverter.

18. A single phase power supply as defined in claim 17 wherein the converter is operated at a switching rate in the range of about 10–20 kHz.

19. A single phase power supply as defined in claim 18 wherein said converter is switched by a pulse width modulator.

20. A single phase power supply as defined in claim 16 wherein the converter is operated at a switching rate in the range of about 10–20 kHz.

21. A single phase power supply as defined in claim 20 wherein said converter is switched by a pulse width modulator.

22. A single phase power supply as defined in claim 11 wherein the converter is operated at a switching rate in the range of about 10–20 kHz.

23. A single phase power supply as defined in claim 22 wherein said converter is switched by a pulse width modulator.

24. A single phase power supply as defined in claim 6 wherein the converter is operated at a switching rate in the range of about 10–20 kHz.

25. A single phase power supply as defined in claim 24 wherein said converter is switched by a pulse width modulator.

26. A single phase power supply as defined in claim 1 wherein the converter is operated at a switching rate in the range of about 10–20 kHz.

27. A single phase power supply as defined in claim 26 wherein said converter is switched by a pulse width modulator.

28. A single phase power supply for electric arc welders comprising: a full wave rectifier forming the input of said power supply; a valley fill power factor correcting circuit for controlling the input current flow to said rectifier and creating an high crest factor intermediate DC voltage; a switching converter forming the output of said power supply for converting said intermediate voltage into a generally ripple free DC output voltage; and, switching means in said converter for controlling said DC output voltage of said converter to a level of less than 113 volts.

29. A single phase power supply as defined in claim 28 wherein said converter is a down chopper.

30. A single phase power supply as defined in claim 28 wherein said converter is a series resonant inverter.

31. A single phase power supply as defined in claim 28 including a transformer with a primary winding connected to a line voltage source and a secondary winding driving said rectifier.

* * * * *